Dec. 15, 1931. L. E. LA BRIE 1,837,128
BRAKE
Original Filed May 23, 1928
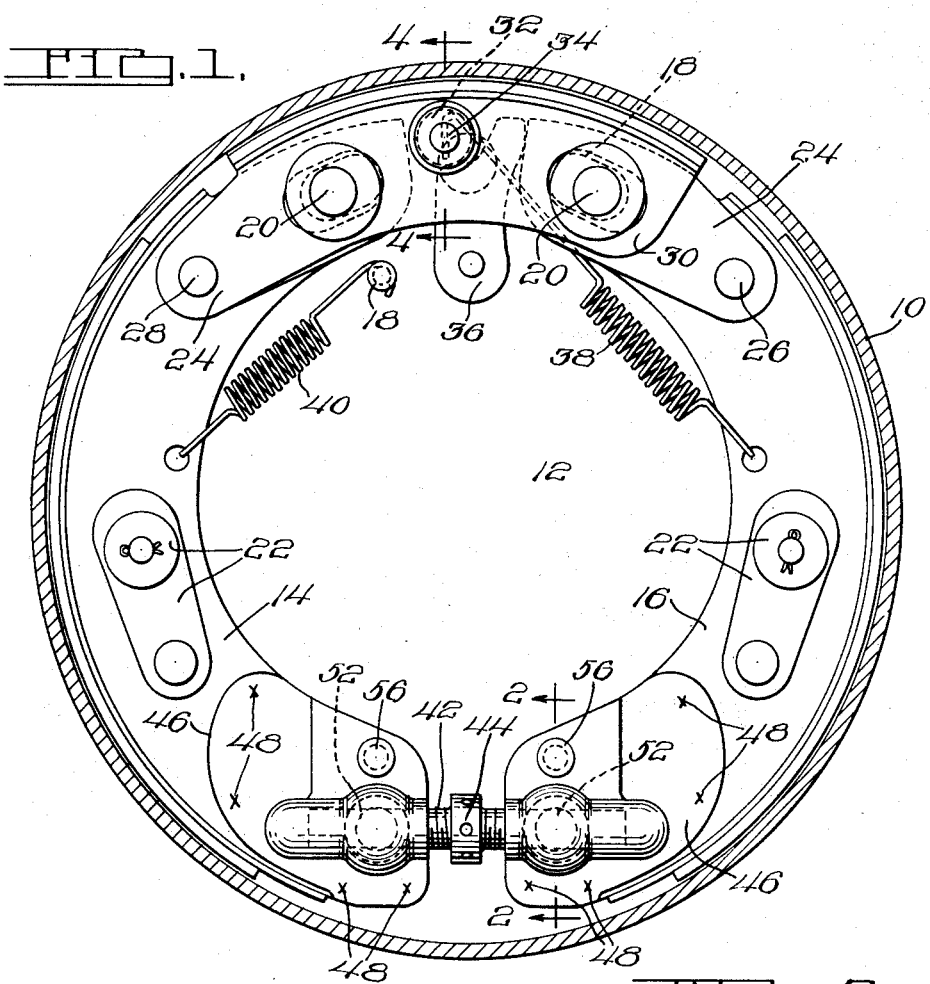
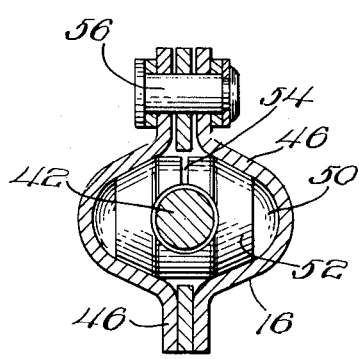
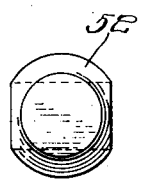
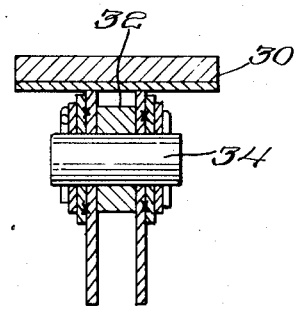
INVENTOR.
*Ludger E. LaBrie*
BY
*Jn. W. McConkey*
ATTORNEY.

Patented Dec. 15, 1931

1,837,128

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed May 23, 1928, Serial No. 279,894. Renewed April 30, 1931.

This invention relates to brakes, and is illustrated as embodied in an internal expanding automobile brake. An object of the invention is to simplify the construction and increase the effectiveness of the brake.

One important feature of the invention relates to providing a simple and inexpensive connection between a pair of brake shoes or the like, by forming the ends of the shoes with sockets to receive an adjusting member engaging connecting members journaled in transverse recesses in the shoe ends intersected by the sockets. Such a socket and recess is, I believe, best formed by cutting a slot in the end of the shoe web and securing to opposite sides of the web a pair of registering plates or stampings formed or depressed to co-operate in defining the socket and recess.

I prefer that the plates be substantially imperforate, closing the ends of the above-described transverse recess, so that the connecting member is not visible in the completed shoe assembly. It is desirable that the ends of the recess be conical, to form bearings for conical ends of the connecting member, and I also prefer to split and distort the connecting member so that it grips the threads of the adjusting member with a friction locking action.

The above and other objects and features of the invention, including a novel means of operating a brake having a servo shoe, and other novel and desirable details of construction, will be apparent from the following description of the illustrative embodiment shown in the accompanying drawings, in which:

Figure 1 is a vertical section through the brake, just inside the head of the brake drum, and showing the brake shoes in side elevation;

Figure 2 is a section through the shoe assembly on the line 2—2 of Figure 1;

Figure 3 is an end elevation of one of the connecting members; and

Figure 4 is a section through the servo shoe on the line 4—4 of Figure 1.

The illustrated brake includes a rotatable drum 10, within which is the friction means of the brake, and at the open side of which is a suitable support such as a backing plate 12. The illustrated friction means includes two pivotally-connected interchangeable shoes 14 and 16, having slots 18 at their ends embracing anchor pins 20 secured to the backing plate 12, and so arranged that shoe 14 anchors on its pin 20 when the drum is turning clockwise while shoe 16 anchors on its pin 20 when the drum is turning counter-clockwise. The shoes are positioned when the brake is released by any suitable steady rests or the like 22.

At their upper ends the stiffening webs of shoes 14 and 16 are reinforced by plates 24 projection-welded to their sides, the openings 18 extending through these plates as well as through the webs. In order that the shoes may be interchangeable, openings 26 are formed in both shoes, only the one in shoe 14 being used for a pivot 28 connecting shoe 14 to a servo shoe 30 having two stiffening webs straddling the upper ends of the webs of shoes 14 and 16 so that the servo shoe in effect overlaps the other two shoes.

A thrust roller 32 is mounted on a pin 34 carried by the two webs of shoe 30, the roller being between the ends of shoes 14 and 16, and engaged by a floating cam or thrust lever 36 which also engages the end of shoe 16. A spring 38 connects pin 34 to shoe 16, thus in effect connecting shoes 30 and 16, while another spring 40 connects shoe 14 to the backing plate 12 and urges it upwardly against anchor 20.

When cam lever 36 is rocked clockwise to apply the brake, while both shoes 14 and 16 remain in engagement with anchors 20, the shoe 30 is rocked about pivot 28 against the drum against the resistance of spring 38. The friction of the drum on shoe 30 then holds shoe 14 against its anchor 20 if the drum is turning clockwise, or shoe 16 against its anchor 20 if the drum is turning counter-clockwise, while the continued action of the cam lever 36 forces shoes 16 and 30 apart to complete the application of the brake.

Structures somewhat similar to this are shown and described in prior applications made by Montgomery W. McConkey and Ludger E. La Brie, Serial No. 230,955 filed November 4, 1927, and Vincent Bendix and Ludger E. La Brie, Serial No. 235,428 filed November 11, 1927, and it is not my intention to claim the subject matter disclosed in those applications.

The lower ends of shoes 14 and 16 are connected by novel means including a right-and-left thread adjusting member 42 having a central collar formed with radial openings 44 to receive an operating tool such as a nail. Member 42 extends into sockets in the ends of the shoes, which are preferably formed by cutting slots in the ends of the shoe webs, and securing substantially imperforate stampings or plates 46 to the sides of the webs, for example by spot welds 48 along their lower edges. Plates 46 are stamped with registering depressions forming the sockets for the ends of the adjusting member 42, and also forming transverse recesses 50, closed at their ends and preferably formed with conical surfaces forming journal bearings for the conical ends of connecting members or pivots 52 threaded on the ends of adjusting member 42. The connecting members 52 are shown split at 54, and distorted inwardly so that they bind frictionally on member 42 to lock it in adjusted positon. Preferably the unwelded sides of plates 46 are connected under fixed tension by headed fastenings 56 passing through the shoe webs, to cause the plates frictionally to grip the ends of members 52.

While one illustrative embodiment has been dscribed in detail, it is not my intention to limit the scope of the invention to that particular embodiment, or otherwise than by the terms of the appended claims.

I claim:

1. A brake comprising a shoe having a joint including a socket extending inwardly from one end of the shoe and intersecting a recess extending transversely of the shoe and having conical ends, a connecting member in said recess having conical ends journaled in the ends of the recess, and an adjusting member extending into said socket and engaging the connecting member.

2. A brake shoe formed with a socket extending inwardly from its end and intersecting a transverse recess having conical ends.

3. A brake shoe formed with a socket extending inwardly from its end and intersecting a transverse recess having closed ends.

4. A brake shoe having a stiffening web, with substantially imperforate plates secured to opposite sides of the web and formed with registering depressed portions jointly forming a socket extending inwardly from the end of the shoe and a transverse recess intersected by said socket.

5. A brake shoe having a stiffening web, with plates secured to opposite sides of the web and formed with registering portions jointly forming a socket extending inwardly from the end of the shoe and a transverse recess intersected by said socket and having conical ends.

6. A brake shoe having a stiffening web, with plates secured to opposite sides of the web and formed with registering portions jointly forming a socket extending inwardly from the end of the shoe and a transverse recess intersected by said socket.

7. A brake shoe having a stiffening web, with plates secured to opposite sides of the web and formed with registering portions jointly forming a socket extending inwardly from the end of the shoe and a transverse recess intersected by said socket, said plates being secured directly to the web at one side and being connected with each other by fixed tension means at the other side.

8. A brake shoe having a stiffening web, with plates secured to opposite sides of the web and formed with registering portions jointly forming a socket extending inwardly from the end of the shoe and a transverse recess intersected by said socket, said plates being secured directly to the web at one side and being connected with each other by means passing through the web at the other side.

9. An adjustable connection for brake shoes or the like comprising a threaded adjusting member, in combination with a transverse connecting member journaled at its ends and threaded on the adjusting member, and which is split and distorted frictionally to grip the adjusting member.

In testimony whereof, I have hereunto signed my name.

LUDGER E. LA BRIE.